3,817,927
PRODUCTION OF SOLUBLE POLYIMIDES
Jenoe Kovacs, Bobenheim-Roxheim, and Wolfgang Eisfeld, Ludwigshafen, Germany, assignors to Badische Anilin- & Soda-Fabrik Aktiengesellschaft, Ludwigshafen am Rhine, Germany
No Drawing. Filed Dec. 1, 1972, Ser. No. 311,394
Claims priority, application Germany, Dec. 3, 1971, P 21 59 935.9
Int. Cl. C08g 20/32
U.S. Cl. 260—65     5 Claims

ABSTRACT OF THE DISCLOSURE

A process for the production of thermoplastic polyimides. 3,3',4,4'-diphenylsulfone tetracarboxylic acid or a derivative of the same which forms amide groups is polycondensed with 4,4'-diaminobenzophenone in a polar organic solvent at a temperature of more than 160° C. to form a polyimide. The polyimides prepared according to the invention are particularly suitable for the production of moldings resistant to high temperatures.

---

The invention relates to a process for the production of soluble thermoplastic polyimides by polycondensation of 4,4'-diaminobenzophenone with 3,3',4,4'-diphenylsulfone tetracarboxylic dianhydride.

The production of aromatic polyimides having high thermal stability and good mechanical properties is known. The products are however generally infusible and insoluble in the usual solvents. Since therefore the processing of these products offers difficulty, polyamidocarboxylic acids are generally first prepared from diamines and tetracarboxylic dianhydrides at low temperatures which are soluble in certain polar organic solvents and these are converted in a second stage into polyimides at elevated temperature while shaping or aftershaping them. A disadvantage which is evident in the prior art method is that the polyamidoacids prepared in the first stage generally have only limited storability and are susceptible to humidity.

The production of soluble polyimides is also disclosed for example in Belgian Pat. 655,654, French Pats. 1,461,-155 and 1,539,074 and U.S. Pat. 3,503,625. The polyimides bear alkyl, alkoxy or phenoxy groups on the aromatic nucleus, may have two SO$_2$ bridges in the aromatic ring or may have aliphatic bridges with aromatic substituents. The starting materials for these polyimides are in some cases difficult to prepare and moreover aliphatic or cycloaliphatic constituents in the polymer structure generally are harmful to the thermal stability of the polymers. The same is true of polyimides based on endocyclic compounds as starting materials such as are prepared according to French Pat. 1,488,924 for the production of soluble polyimides from bicyclo-2,2,2-octene-7-tetracarboxylic-2,3,5,6 dianhydrides and aromatic diamines.

The object of the present invention is to provide a simple method of producing polyimides which are stable at high temperatures and which have valuable properties.

We have found that surprisingly polyimides which are soluble and resistant to high temperature can be advantageously prepared by condensing a tetracarboxylic acid of the formula A:

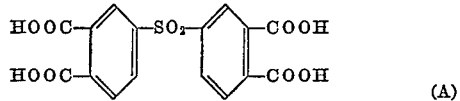

(A)

or a derivative thereof which forms amido groups with 4,4'-diaminobenzophenone in a polar organic solvent at a temperature above 160° C. These properties of the polymers could not have been foreseen.

Dissolved polyimides having molecular weights of more than 10,000 and intrinsic viscosities of from 0.1 to 3.0, preferably from 0.2 to 1.0, dl./g. (measured as a 0.5% solution in N-methylpyrrolidone; cf. Houben-Weyl, "Methoden der organischen Chemie," 4th edition, volume III/1, pages 431 et seq., Stuttgart, 1955) are obtained in the process of the invention by polymerization and imidization in a single stage.

Carboxylic halides and especially chlorides, carboxylic esters of one to four carbon atoms in the alcohol residue and particularly anhydrides are suitable as derivatives of tetracarboxylic acids of formula (A) which form amido group.

The solvent used for the reaction should be inert, i.e. should not react either with the tetracarboxylic acid of formula (A) or a derivative thereof or with the 4,4'-diaminobenzophenone. Furthermore it should boil above 160° C. and preferably above 180° C. Examples of suitable polar solvents are N-methylpyrrolidone, dimethylsulfoxide and hexamethylphosphoramide. It is very advantageous to add to the solvent a small amount of a diluent such as xylene, toluene or benzene which forms an azeotropic mixture with water so that removal of the water eliminated in the reaction presents no problems. The polycondensation mixture contains in all generally from 5 to 40% by weight, preferably from 10 to 30% by weight, of the reactants and from 95 to 60% by weight, preferably from 90 to 70% by weight, of solvent. The tetracarboxylic acid (A) or the amide-forming derivative thereof is preferably reacted with 4,4'-diaminobenzophenone in an equimolar amount. The reactants may however be present in an excess or deficiency of up to 10% molar.

The process of the invention may for example be carried out advantageously by dissolving the diamine in a polar solvent, diluting the solution for example with a little xylene and heating the solution at a temperature above 160° C. and preferably at from 180° to 210° C. A solution of the tetracarboxylic acid of the formula (A) or preferably its dianhydride in the same polar solvent as that in which the diamine has been dissolved and which has also been diluted with a little xylene is then dripped in and at the same time the water formed is distilled off as an azeotrope by passing an inert gas such as nitrogen through the reaction vessel. The soluble polyimide is thus obtained in one stage in a short time.

Alternatively, polyimide powder may be recovered from the resulting polyimide solution by mixing the solution with a precipitant. Alcohols, ethers or aromatic hydrocarbons such as toluene and benzene are suitable as precipitants and it is preferred to use methanol. The ratio of precipitant to solvent is generally between 1:1 and 1:20, preferably about 1:5. If the polyimide solution is introduced into methanol while stirring, a polyimide is obtained as a fine, flocculant, easily filterable powder. By repeated washing with methanol a polyimide powder is obtained which is devoid of solvent and which can readily be dried to constant weight at elevated temperature and without crystallization of the polyimide. It is therefore not necessary (as in German Pat. 1,198,547) to add desiccating agents during precipitation in order to obtain a finely divided polyimide in solid form.

Products prepared according to the invention may be used for the production of films, coatings, fibers, press-molding compositions and the like. Processing the polyimide powder by pressure sintering gives very good results. For this purpose the finely divided polyimide powder having a mean particle size of less than 600 microns and preferably from 50 to 400 microns is brought to sintering temperature and shaped at a pressure of more than 2200 kg./cm.$^2$ and particularly of from 2500 to 3000 kg./cm.$^2$. The preferred sintering temperatures are from 340° to 420° C. Sintering times may vary between one minute and several hours. Polyimide sintered articles prepared in this way have excellent mechanical properties. The ultimate tensile strength of more than 700 kg./cm.², the modulus of elasticity of more than 32,000 kg./cm.², the elongation at break of more than 3% and the hardness according to German Industrial Standard DIN 53,456 of more than 1500 kg./cm.² are worthy of mention.

Polyimides prepared according to the invention may also be processed with advantage in combination with other finely particled materials such as graphite, metals, metal oxides, minerals, glasses and the like into moldings. The materials may be easily worked into the polyimide solution as a suspension and precipitated together with the polyimide particles. By sintering the polyimide powder alone or together with fillers it is possible to manufacture rods, boards, electrical insulators, piston rings, brake linings, grinding media and similar articles.

The following examples illustrate the invention. The parts specified are by weight unless otherwise stated. Parts by weight bear the same relation to parts by volume as the kilogram to the liter.

EXAMPLE 1

A freshly prepared solution of 21.2 parts of pure 4,4'-diaminobenzophenone in 100 parts by volume of N-methylpyrrolidone and 20 parts by volume of xylene is heated up to 180° C. so that the xylene boils vigorously. A solution of 35.8 parts of 3,3',4,4'-diphenylsulfone tetracarboxylic dianhydride in 127 parts by volume of N-methylpyrrolidone is slowly dripped into the said solution, the water of reaction formed being distilled off with the xylene. After the amount of water to be expected according to theory has distilled off the solution is cooled to room temperature. A viscous solution is obtained. The polyimide obtained has an intrinsic viscosity of 0.42 dl./g. (measured at 30° C. in a 0.5% by weight solution of the polyimide in N-methylpyrrolidone).

Layers having a thicknes of 250 microns are produced on sheets of glass. The glass is then heated to 220° C. in the course of two hours. The solvent is thus evaporated and a film having a thicknes of about 50 microns remains. It may be removed from the surface of the glass after it has been treated with hot water at 25° to 50° C. The tear resistance of the films thus prepared is more than 1000 kg./cm.². The thermal stability of the films is determined by the folding test by storing at 300° C. in a drying cabinet. It is more than 300 hours.

EXAMPLE 2

A solution of a polyimide is prepared as described in Example 1. The solution obtained is introduced with vigorous stirring into 1200 parts by volume of methanol, and the finely flocculent polyimide thus precipitated is suction filtered and washed with methanol. The polyimide powder is dried in stages at 60° C., 180° C. and finally under nitrogen at 250° C. The finely particled polyimide powder which results may easily be ground and screened through a 100 micron sieve. For the production of sintered articles the powder is heated under nitrogen to 380° C. and placed in a preheated compression mold where it is molded under a pressure of 2500 kg./cm.². The polyimide molding obtained in this way has an ultimate tensile strength of 946 kg./cm.², a modulus of elasticity of 37,566 kg./cm.², an elongation at break of 3.2% and a hardness (according to DIN 53,456) of 1583 kg./cm.².

EXAMPLE 3

The procedure of Example 1 is adopted but xylene is not previously placed in the reactor but is dripped in with the 3,3',4,4'-diphenylsulfone tetracarboxylic dianhydride solution. The resulting polyimide has an intrinsic viscosity of 0.25 dl./g. (measured at 30° C. in a 0.5% by weight solution of the polyimide in N-methylpyrrolidone). Coatings having good mechanical properties may be prepared from the solution.

EXAMPLE 4

35.8 parts of 3,3',4,4'-diphenylsulfone tetracarboxylic dianhydride is suspended in 128 parts by volume of methanol and kept at boiling temperature until the anhydride has passed into solution. Excess methanol is then distilled off. The white powder is then dissolved in 200 parts by volume of N-methylpyrrolidone. The solution is heated to 180° C. and 21.2 parts of pure 4,4'-diaminobenzophenone and 28 parts by volume of N-methylpyrrolidone are added. The temperature of the solution is slowly raised to 200° C., 12.8 parts of methanol being distilled off. A viscous solution is obtained having an intrinsic viscosity of 0.45 dl./g. measured at 30° C. in a 0.5% by weight solution of the polyimide in N-methylpyrrolidone.

Glass cloth is dipped into the solution and then cured for thirty minutes at 220° C. and the steps of dipping and curing are repeated until the resin content of the resulting prepreg has reached 50%. Laminates whose flexural strength is 3600 kg./cm.² can be prepared from the glass fiber prepreg at 350° C. under a pressure of 250 kg./cm.²,

We claim:
1. A process for the production of thermoplastic polyimides that are soluble in polar organic solvents by a polycondensation reaction which comprises: reacting a tetracarboxylic acid of the formula (A):

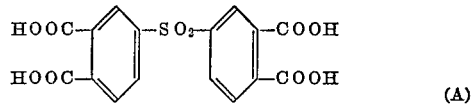

(A)

or a derivative thereof which forms amido groups selected from the group consisting of a carboxylic halide, a carboxylic ester having one to four carbon atoms in the alcohol residue and a carboxylic anhydride with an equimolar amount plus or minus 10% of 4,4'-diaminobenzophenone in a polar organic solvent at a temperature above 160° C.

2. A polyimide powder having a mean particle size of from 50 to 400 microns, said polyimide having a molecular weight greater than 10,000 and being soluble in a polar organic solvent, said polyimides being formed by the process of claim 1.

3. A process as set forth in claim 1 wherein the reaction of the reactants used in about equimolar amounts is carried out while distilling off the water of reaction simultaneously in the presence of a diluent which forms an azeotrope with water.

4. A process as set forth in claim 1 wherein the dianhydride is used as derivative of 3,3',4,4'-diphenylsulfone tetracarboxylic acid.

5. A process as set forth in claim 1 wherein N-methylpyrrolidone, dimethylsulfoxide or hexamethylphosphoramide or a mixture of the same with xylene, toluene or benzene is used as the polar organic solvent.

References Cited

UNITED STATES PATENTS

| | | | |
|---|---|---|---|
| 3,666,709 | 5/1972 | Suzuki et al. | 260—33.4 P |
| 3,416,994 | 12/1968 | Chalmers et al. | 161—227 |
| 3,179,631 | 4/1965 | Endrey | 260—78 |
| 3,249,588 | 5/1966 | Gall | 260—47 |
| 3,546,175 | 12/1970 | Angelo | 260—65 |
| 3,654,227 | 4/1972 | Dine-Hart | 260—37 N |

LESTER L. LEE, Primary Examiner

U.S. Cl. X.R.

260—30.2, 30.6 R, 30.8 DS, 32.6 N, 37 N, 78 TF